3,631,187
WATER-SOLUBLE DERIVATIVES OF ACYL-
PHENYLACYLAMIDO-1,3-PROPANEDIOLS
Maximilian von Strandtmann, Rockaway Township, John Shavel, Jr., Mendham, and George Bobowski, East Orange, N.J., assignors to Warner-Lambert Company, Morris Plains, N.J.
No Drawing. Filed Apr. 26, 1965, Ser. No. 451,008
The portion of the term of the patent subsequent to May 11, 1982, has been disclaimed
Int. Cl. C07c 69/34
U.S. Cl. 260—404     3 Claims

ABSTRACT OF THE DISCLOSURE

The invention discloses certain water soluble 1,3-substituted propanediols of the formula:

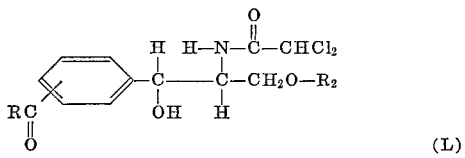
(L)

wherein R is alkyl or aryl $R_2$ is a member selected from the group consisting of palmitoyl, palmitoyloxyacetate and hemisuccinoyl. These derivatives are useful as antimicrobial agents.

---

This invention relates to a composition of matter and more particularly, it relates to water-soluble derivatives of acylphenylacylamido-1,3-substituted propanediols of the formula:

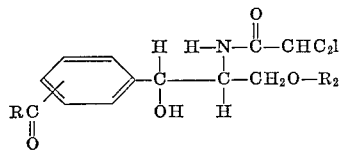

wherein R represents lower alkyl such as methyl, ethyl, propyl, isopropyl or isobutyl, cycloalkyl such as cyclopentyl or cyclohexyl, substituted cycloalkyl, aryl such as phenyl, substituted aryl such as tolyl or hydroxyphenyl, heterocyclic such as pyridyl or furyl and $R_2$ represents hemi-succinoyl,

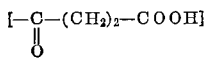

palmitoyl,

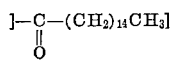

or palmitoyloxyacetyl, $—CCH_2OC(CH_2)_{14}CH_3$.

The parent acylphenylacylamido-1,3-propanediols such as D-threo-1-(p-acetylphenyl)-2-(2,2-dichloroacetamido)-1,3-propanediol which is also known under the generic name of cetophenicol are novel compounds, and they are disclosed and claimed in U.S. Pat. No. 3,183,265. These compounds were found to be significant anti-microbial agents. For example, they are useful against infections caused by gram negative bacteria, rickettsia and certain protozoa. In use they are combined with a nontoxic carrier and administered orally or parentally. These novel compounds are bitter and insoluble in aqueous solvents. Because of their bitterness, these compounds cannot be formulated into satisfactorily palatable oral dosage unit forms and because of their insolubility in aqueous solvents, these drugs are insufficiently absorbed to give an optimum blood concentration. The maintenance of optimum blood concentration is, of course, essential in order for the drug to exert its anti-bacterial effect. This is specially important in urinary tract infections.

Accordingly, a primary object of this invention is to prepare water-soluble derivatives of these anti-microbial agents.

A further object of this invention is to prepare derivatives of these anti-microbial agents which are substantially non-bitter.

Yet another object of this invention is to provide water-soluble derivatives of these anti-microbial agents which will be absorbed to give optimum blood concentration.

Yet another object of this invention is to provide water-soluble derivatives of these anti-microbial agents which can provide anti-bacterial effects in the urinary tract.

Other objects and advantages of this invention will become apparent from the following detailed description.

According to the present invention, the hemi-succinate derivatives of substituted 1,3-propanediols may be prepared by reacting the selected acylphenylacylamido-1,3-propanediol with succinic anhydride. This reaction is effected at about 80° C. employing substantially anhydrous pyridine over a period of about 3 hours. At the completion of the reaction, the solvent may be removed by distillation or evaporation in a vacuum. The residue obtained after removal of the solvent is suspended in an aqueous solvent and the resulting suspension may be extracted with ethyl acetate or other suitable organic solvents. The aqueous layer remaining after the extraction is treated with an acid to recover the desired water-soluble derivative in the form of a precipitate. Purification may be effected employing conventional procedures such as recrystallization techniques.

The palmitate and palmitoyloxyacetate derivatives of this invention are prepared by reacting the appropriate starting acylphenyl-1,3-propanediol derivative with palmitoyl chloride or palmitoyloxyacetyl chloride at low temperature such as —5 to 0° C. in anhydrous pyridine. This step si followed by precipitating the reaction mixture with ethyl acetate, filtering, discarding the precipitate, and recovering the desired product from the filtrate by evaporation of the solvent. The crude product thus obtained may be purified by recrystallization techniques.

Suitable acylphenylacylamido-1,3-propanediols which may be made water-soluble by converting to the corresponding palmitate succinate or palmitoyloxyacetate by the above reaction are, for example:

D-threo-1-(p-acetylphenyl)-2-(2,2-dichloroacetamido)-1,3-propanediol
D-threo-4'-[2-(2,2-dichloroacetamido)-1,3-dihydroxypropyl]acetophenone thiosemicarbazone
D-threo-1-(p-benzoylphenyl)-2-(2,2-dichloroacetamido)-1,3-propanediol
D,L-threo-1-(p-acetylphenyl)-2-(2,2-dichloroacetamide)-1,3-propanediol The above-described derivatives of acylphenylacylamido-1,3-propanediol are water soluble. In experiments we have found they can sustain remarkably high concentrations in the urinary tract over their parent compounds thereby giving these derivatives an unexpected utility as a urinary antiseptic. For use these derivatives may be formulated into solid dosage forms such as tablets, capsules or fluid dosage forms such as solutions for injection; generally each dose contains from 100 to 1000 mg. of the active ingredient. These novel derivatives may also be combined with other urinary antiseptics such as methenamine mandelate or other chemo-therapeutic agents such as sulfa drugs, the nitrofurans and colistin derivatives.

The following examples are given in order to further illustrate this invention.

EXAMPLE 1

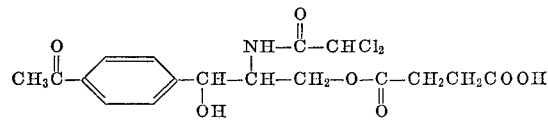

D-threo-1-(p-acetylphenyl)-2-(2,2-dichloroacetamido)-1,3-propanediol-3-hemisuccinate A solution of 2.0 g. of D-threo-1-(p-acetylphenyl)-2-(2,2 - dichloroacetamido) - 1,3-propanediol and 0.77 g. of succinic anhydride in 20 ml. of anhydrous pyridine is heated for three hours at 80° C. The solvent is removed in vacuo. The gummy residue is taken up with a solution of 0.6 g. of sodium bicarbonate in 10 ml. water and extracted twice with 25 ml. of ethyl acetate. The combined ethyl acetate extracts are dried over sodium sulfate and the solvent is removed in vacuo to give 0.4 g. of the starting material. The aqueous layer is acidified with dilute hydrochloric acid at 0° C. to give 1.9 g. of D-threo-1-(p-acetylphenyl)-2-(2,2-dichloroacetamido)-1,3-propanediol-3-hemisuccinate as a tan colored, amorphous compound, M.P. 115–120° C. Two recrystallizations from ethyl acetate gives analytically pure, white crystals, M.P. 123–124° C.;

$\lambda^{EtOH}_{max.}$ mμ (ε) 251 (16,000), 285 sh. (1400); γ Nujol 803 (m.), 1072(m.), 1178 (v.s.), 1212 (v.s.), 1535 (s.), 1610 (m.), 1658 (s.), 1682 (v.s.), 1722 (v.s.), 1738 (s.), 3360 (m.), 3480 (m.) cm.$^{-1}$;

$\gamma^{CH_3CO}_{max.}$ 1150 (s.), 1262 (s.), 1610 (m.), 1685 (s.), 1708 (s.), 1740 (v.s.), 2920 (w.), 330 (m.), 3410 (m.) cm.$^{-1}$.

*Analysis.*—Calcd. for $C_{17}H_{19}NO_7$ (percent): C, 48.59; H, 4.56; N, 3.33; Cl, 16.87. Found (percent): C, 48.55; H, 4.60; N, 3.35; Cl, 16.87, 16.96.

EXAMPLE 2

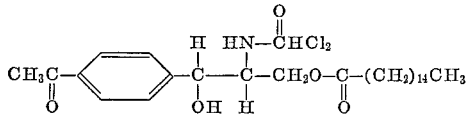

D-threo-1-(p-acetylphenyl)-2-(2,2-dichloroacetamido)-1,3-propanediol 3-palmitate To a solution of 8.0 g. of D-threo-1-(p-acetylphenyl)-2-(2,2-dichloroacetamido)-1,3-propanediol in 25 ml. of anhydrous pyridine is added 7.85 g. (15% excess) of palmitoyl chloride dropwise over a period of 10 minutes with stirring at 0° C. The reaction mixture is allowed to warm up to 20 to 30° C. and the stirring is continued for 30 minutes. After standing in the refrigerator for 10 to 24 hours the reaction mixture is treated with 100 ml. ethyl acetate and the resulting precipitate is filtered off to give 2.4 g. of nearly white crystals, M.P. 145–146° C. which is discarded. The filtrate is washed with saturated aqueous sodium chloride solution, dried over sodium sulfate and evaporated to dryness in vacuo to yield a residue of D-threo-1-(p-acetylphenyl)-2-(2,2-dichloroacetamido)-1,3-propanediol 3-palmitate. Crystallization of this residue from ether-Sekllysolve B (1:1) gives 8.8 g. of nearly white crystals, M.P. 80–81° C. Concentration of the mother liquor to a low volume and cooling gives an additional crop of 1.7 g. of almost white crystals, M.P. 80–81° C. total yield: 10.5 g. (75%). Recrystallization of these crystals from cyclohexane gives analytically pure white crystals, M.P. 80.5–82° C.;

$\lambda^{EtOH}_{max.}$ mμ (ε) 250.5 (16,500), 289 sh. (1,200)

$\gamma^{Nujol}_{max.}$ 807 (w.), 1068 (m.), 1160 (m.), 1270 (m.), 1528 (m.), 1612 (w.), 1680 (v.s.), 1715 (s.), 1738 (s.), 3320 (m.), 3500 (m.) cm.$^{-1}$ $\gamma^{CHCl_3}_{max.}$ 1170 (m.), 1262 (s.), 1520 (s.), 1612 (m.), 1691 (v.s.), 1730 (s.), 1740 (s.), 2830 (s.), 2900 (s.), 3400 m.), 3600 (w.) cm.$^{-1}$.

*Analysis.*—Calcd. for $C_{29}H_{45}NCl_2O_5$ (percent): C, 62.36; H, 8.12; N, 2.50; Cl, 12.69. Found (percent): C, 62.10; H, 8.17; N, 2.64; Cl, 12.85, 12.69.

It is understood that the foregoing detailed description is given merely by way of illustration and that many variations may be made therein without departing from the spirit of our invention.

Having described our invention, what we desire to secure by Letters Patent is:

1. A compound of the formula:

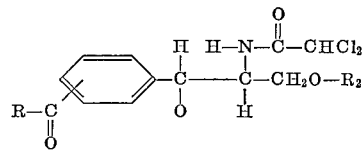

wherein R is a member selected from the group consisting of lower alkyl, cyclopentyl, cyclohexyl and phenyl, $R_2$ is a member selected from the group consisting of palmitoyl, palmitoyloxyacetate and hemi-succinoyl.

2. D-threo-1-(p-acetylphenyl) - 2 - (2,2,-dichloroacetamido)-1,3-propanediol 3-hemisuccinate.

3. D-threo-1-(p-acetylphenyl) - 2 - (2,2-dichloroacetamido)-1,3-propanediol 3-palmitate.

References Cited

UNITED STATES PATENTS 2,662,906  12/1953  Edgerton _____ 260—404
3,183,265   5/1965  Strandtmann et al. ___ 260—552

ALEX MAZEL, Primary Examiner

R. V. RUSH, Assistant Examiner

U.S. Cl. X.R.

260—485 G; 424—312, 313